United States Patent
Nakamizo et al.

(10) Patent No.: US 7,080,621 B2
(45) Date of Patent: Jul. 25, 2006

(54) AIR CLEANER UNIT FOR COMBUSTION ENGINE

(75) Inventors: Keiichi Nakamizo, Hyogo (JP); Takao Sasamura, Akashi (JP); Atsuhiro Yoshimatsu, Akashi (JP); Yukio Miki, Akashi (JP)

(73) Assignee: Kawasaki Jukogyo Kabushika Kaisha, Hyogo (JP)

( * ) Notice: Subject to any disclaimer, the term of this patent is extended or adjusted under 35 U.S.C. 154(b) by 80 days.

(21) Appl. No.: 10/974,131

(22) Filed: Oct. 27, 2004

(65) Prior Publication Data
US 2005/0092284 A1    May 5, 2005

(30) Foreign Application Priority Data
Oct. 31, 2003  (JP) ............... 2003-371906

(51) Int. Cl.
*B01D 46/00* (2006.01)

(52) U.S. Cl. .................. 123/198 E; 55/385.3
(58) Field of Classification Search ........... 123/198 E, 123/41.65, 41.62, 41.7; 55/385.3, 385.1
See application file for complete search history.

(56) References Cited

U.S. PATENT DOCUMENTS

| | | | |
|---|---|---|---|
| 4,537,160 A | | 8/1985 | Shiral |
| 4,783,207 A | * | 11/1988 | Nagashima et al. .......... 55/498 |
| 4,862,981 A | * | 9/1989 | Fujikawa et al. .......... 108/68.4 |
| 4,946,482 A | * | 8/1990 | Tamba et al. .................. 55/320 |
| 6,391,073 B1 | * | 5/2002 | Koga .......................... 55/289 |
| 6,994,059 B1 | * | 2/2006 | Greppmair ............. 123/73 AD |

* cited by examiner

*Primary Examiner*—Henry C. Yuen
*Assistant Examiner*—Hyder Ali

(57) ABSTRACT

An air cleaner unit of the present invention includes a removable cleaner case having defined therein an outflow port, located below the filter element, for discharging an air, introduced into the cleaner case, towards the combustion engine and including a case body opening downwardly and a bottom plate closing the opening of the case body, and a filter element replaceably accommodated within the cleaner case for substantially purifying the air introduced into the cleaner case through an air intake port. A pedestal is carried by the combustion engine and has an outer peripheral surface, which is substantially in flush with an outer peripheral surface of the filter element within the cleaner case. This filter element within the cleaner case is removably mounted on the pedestal. The bottom plate has a mounting hole defined therein and encircling the outer peripheral surface of the pedestal.

8 Claims, 10 Drawing Sheets

AIR CLEANER UNIT FOR COMBUSTION ENGINE

BACKGROUND OF THE INVENTION

1. Field of the Invention

The present invention generally relates to an air cleaner unit for a combustion engine mounted on a working vehicle such as a lawn tractor and, more particularly, to the structure of the air cleaner unit that is excellent in maintenance including, for example, replacement of a filter element and/or interior cleaning of a cleaner case.

2. Description of the Prior Art

Some of the general-purpose combustion engines currently mounted on working vehicles include an air cleaner unit mounted atop a carburetor. For example, U.S. Pat. No. 4,537,160, issued Aug. 27, 1985, to Shirai and assigned to Kawasaki Jukogyo Kabushiki Kaisha, discloses an air cleaner unit including a cleaner case of two-piece construction including upper and lower case components, which are in the form of a top cover and a case body, respectively. The cleaner case is fluidly connected with an inlet tube by bolts or nuts.

Since the cleaner case employed in the prior art air cleaner unit is of two-piece construction including the case body and the top cover mounted on the case body to close the top opening of the case body, replacement of a filter element accommodated within the case body requires removal of the top cover, followed by removal of the used filter element from the case body in readiness of loading of a fresh filter element. Because of this replacement procedure, during the replacement of the filter element, dust and dirt sticking to the used filter element tend to separate from the used filter element and then fall into the case body, eventually entering the combustion engine. While during the maintenance of the air cleaner unit cleaning of the cleaner case is also required, the cleaner case of the two-piece construction requires the top cover and the case body to be individually removed, resulting in a complicated and time-consuming work.

SUMMARY OF THE INVENTION

In view of the foregoing, the present invention is intended to provide an improved air cleaner unit for a combustion engine, which is designed to effectively avoid an undesirable ingress of dust and dirt into the combustion engine during the maintenance and also to allow a cleaner case to be easily removed to facilitate replacement of a filter element with a fresh one and interior cleaning of the cleaner case.

In order to accomplish the foregoing object, an air cleaner unit for a combustion engine in accordance with the present invention includes a removable cleaner case having defined therein an outflow port for discharging an air, which is introduced into the cleaner case, towards the combustion engine and including a case body opening downwardly and a bottom plate closing the opening of the case body, and a filter element replaceably accommodated within the cleaner case for substantially purifying the air introduced into the cleaner case. The outflow port is defined at a location below the filter element. A pedestal is carried by the combustion engine and has an outer peripheral surface. This filter element is removably mounted on the pedestal. The bottom plate of the case body has a mounting hole defined therein and encircling the outer peripheral surface of the pedestal. The mounting hole is capable of passing the filter element.

According to the present invention, while the filter element is supported on the pedestal, the case body and the bottom plate forming respective parts of the cleaner case can, in their entirety, be removed from the pedestal. Once the cleaner case is so removed, the filter element resting on the pedestal is exposed to the outside and can easily be removed from the pedestal. In other words, since prior to the removal of the filter element from the pedestal the cleaner case has already been removed from the pedestal, there is no possibility that dust and dirt sticking to an outer periphery of the filter element may fall inside the cleaner case and then enter the combustion engine.

Preferably, the outer peripheral surface of the pedestal is substantially in flush with an outer peripheral surface of the filter element.

Specifically, since the outer peripheral surface of the pedestal is substantially in flush with the outer peripheral surface of the filter element, no space, which the dust and dirt sticking to the outer periphery of the filter element and subsequently separating from the filter element would accumulate, is available between the outer peripheral surface of the filter element and an outer peripheral edge of the pedestal. Accordingly, during removal of the filter element, the dust and dirt separating from the outer periphery of the filter element can fall directly to the outside and, therefore, such dust and dirt can hardly enter the combustion engine after passing the pedestal through the outflow port.

Removal of dust and dirt sticking to an inner surface of the cleaner case can be carried out after the cleaner case has been removed from the pedestal and, therefore, there is no way for dust and dirt, sticking to the inner surface of the cleaner case, to fall into the combustion engine.

In addition, since the cleaner case can easily be removed and separated from the filter element merely by moving the cleaner case straight in a direction perpendicular to the pedestal, the workability associated with maintenance is excellent.

In a preferred embodiment of the present invention, the cleaner case may also have an air intake port defined therein at a location adjacent one side thereof for introducing the air into the cleaner case and have a partition wall separating the air intake port from the filter element. Also, the partition wall may have a communicating opening defined therein at a location adjacent the opposite side of the cleaner case spaced a distance from the air intake port for allowing the air, introduced through the air intake port, to flow therethrough across the filter element.

The partition wall in the cleaner case divides an interior of the cleaner case into a first chamber, i.e., an air intake chamber, communicated with the air intake port, and a second chamber, i.e., a filter element chamber accommodating the filter element therein, and those chambers are communicated with each other only through the communicating opening. Accordingly, the air drawn into the air intake chamber through the air intake port flows along the partition wall towards the communicating opening, spaced a distance from the air intake port, and is then deflected substantially 90° so as to flow into the filter element chamber through the communicating opening. During the course of flow of the air from the air intake chamber to the filter element chamber by way of the communicating opening, heavy dust and dirt and rainwater are removed from the flowing air by the effect of an inertia force. In view of this, the air containing minimized quantities of rainwater and dust and dirt flows through the filter element, thereby minimizing a possible reduction in filtering performance of the filter element.

It is to be noted that the effect of removing the heavy dust and dirt and the rainwater at a location upstream of the filter element in the manner described above can be enhanced if the partition wall is made to extend substantially vertically within the cleaner case, or if the air intake port is defined in a top portion of the cleaner case and the communicating opening is defined in a lower portion of the partition wall with a substantial distance secured between the air intake port and the communicating opening.

In another preferred embodiment of the present invention, the bottom plate may have a flashing protuberance so defined at a lower portion of the communicating opening as to extend upwardly for avoiding ingress of a liquid medium from the first chamber into the second chamber through the communicating opening.

This is particularly advantageous in that rainwater accumulating within the air intake chamber divided by the partition wall is prevented from entering the filter element chamber by the flashing protuberance. Accordingly, adherence of the rainwater to the filter element can effectively be avoided.

In a further preferred embodiment of the present invention, the pedestal may be formed integrally with an intake pipe for introducing the substantially purified air into a fuel supply device of the combustion engine. This is particularly advantageous in that since the pedestal is of one-piece construction including the intake pipe, the number of component parts used and the number of assembling steps can be reduced.

In a still further preferred embodiment of the present invention, the pedestal may have at least one bolt embedded therein and extending through the filter element, in which case the filter element is fixed on the pedestal by means of at least one first nut threaded onto a top end of the bolt and the cleaner case, while covering the filter element, is immovably supported on the pedestal by means of at least one second nut threaded onto the top end of the bolt.

Mounting of the cleaner case and the filter element on the pedestal in this way allows the cleaner case in its entirety, including the case body the bottom plate, to be readily and easily removed from the pedestal by undoing the second nut. In addition, the filter element can also readily and easily be removed from the pedestal by undoing the first nut. Since the common bolt is used for fixing the cleaner case and the filter element, the structure can advantageously be simplified with a minimized number of component parts used.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
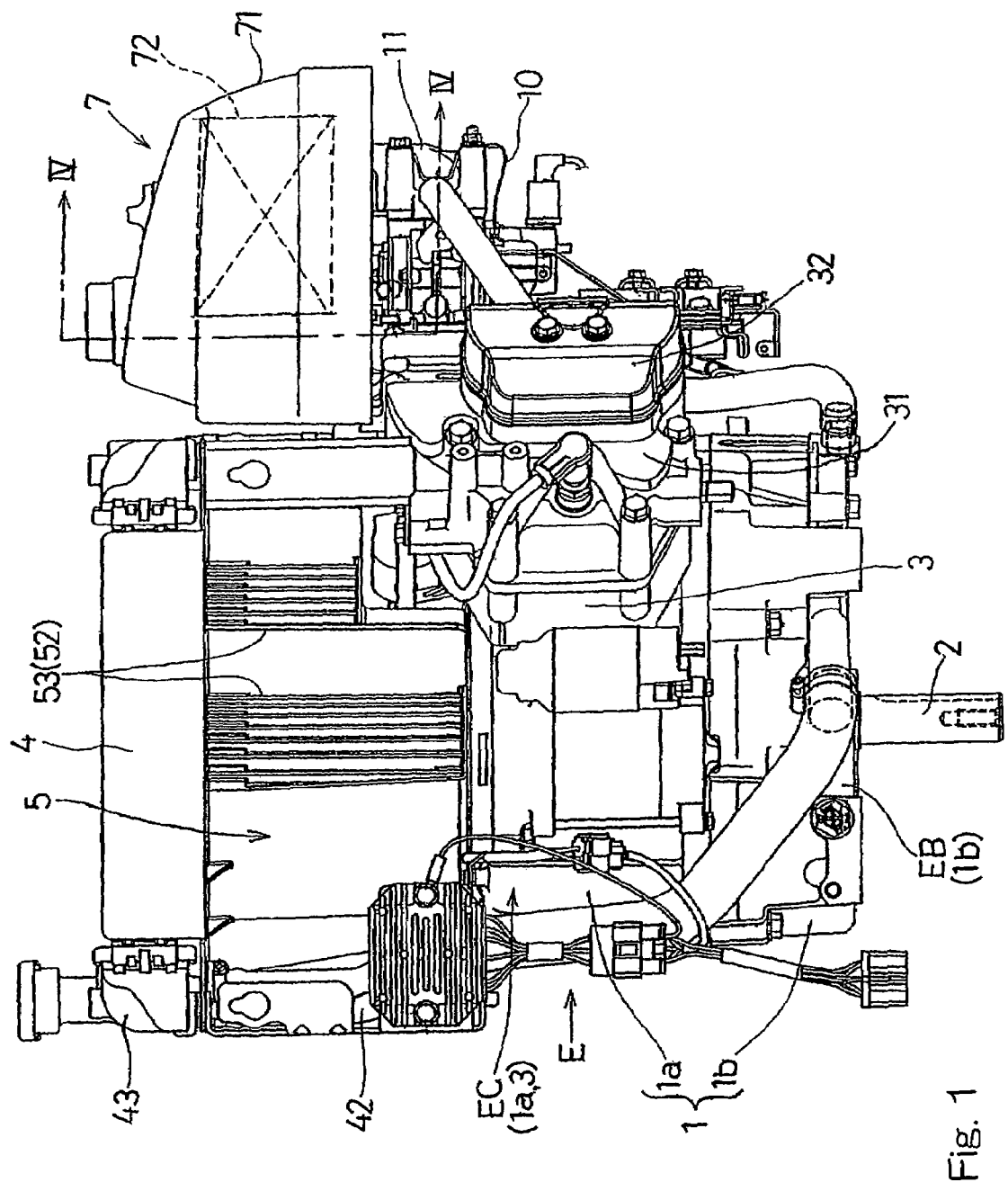
FIG. 1 is a side view of a liquid-cooled, vertical shaft type internal combustion engine employing an air cleaner unit designed in accordance with a preferred embodiment of the present invention.

Hereinafter, a preferred embodiment of the present invention will be described in detail with reference to the accompanying drawings. Referring first to FIG. 1 showing a side view of an internal combustion engine employing an air cleaner unit 7 designed in accordance with the preferred embodiment of the present invention, the combustion engine shown therein is in the form of a liquid-cooled, vertical shaft type two-cylinder internal combustion engine generally used in a working vehicle such as a lawn tractor.

The combustion engine shown in FIG. 1 includes an engine body E including a crankcase 1, engine cylinders 3, cylinder heads 31 and a rocker cover 32, and a radiator 4 positioned above the engine body E for cooling a coolant used to cool the combustion engine. A crankshaft 2 is rotatably supported within the crankcase 1 of the engine body E so as to extend substantially vertically, and the engine cylinders 3 and the cylinder heads 31 are arranged at a front portion of the engine body E. The combustion engine also includes a cooling fan 6, best shown in FIG. 2, which is operatively accommodated within a duct 5 and positioned below the radiator 4.

Figure 2:
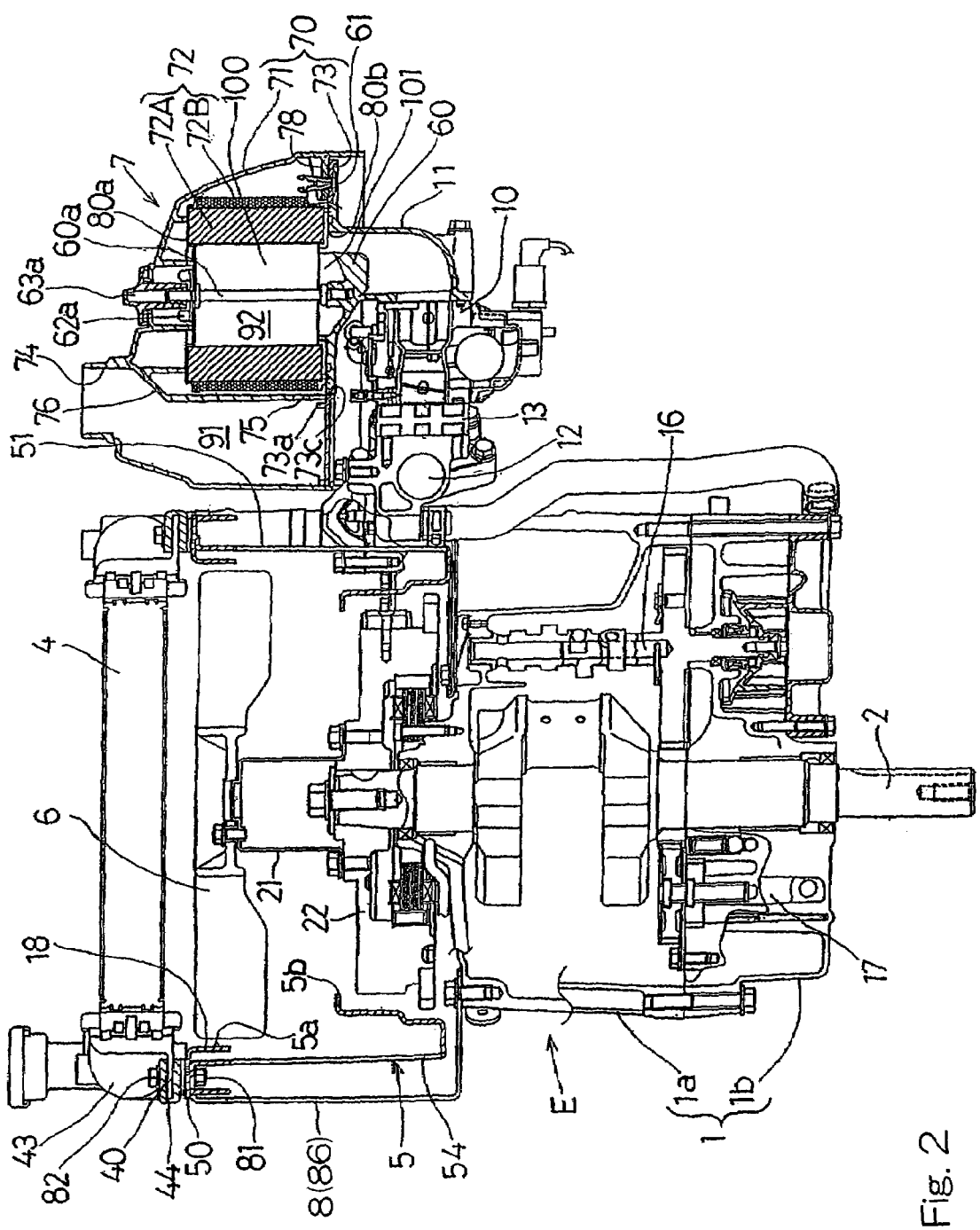
FIG. 2 is a longitudinal sectional view of the internal combustion engine employing the air cleaner unit shown in FIG. 1

The air cleaner unit 7 is disposed at a location radially outwardly of the duct 5 and forwardly of the engine body E. A fuel supply device 10 such as a carburetor or a fuel injection device is arranged beneath the air cleaner unit 7 and is fluidly connected with the air cleaner unit 7 through an intake pipe 11. This fuel supply device 10 is on the other hand fluidly connected with an intake manifold 12 through an insulator 13 as shown in FIG. 2. The fuel supply device 10 and the intake pipe 11 include two intake passages communicated respectively with the two engine cylinders.

Figure 3:
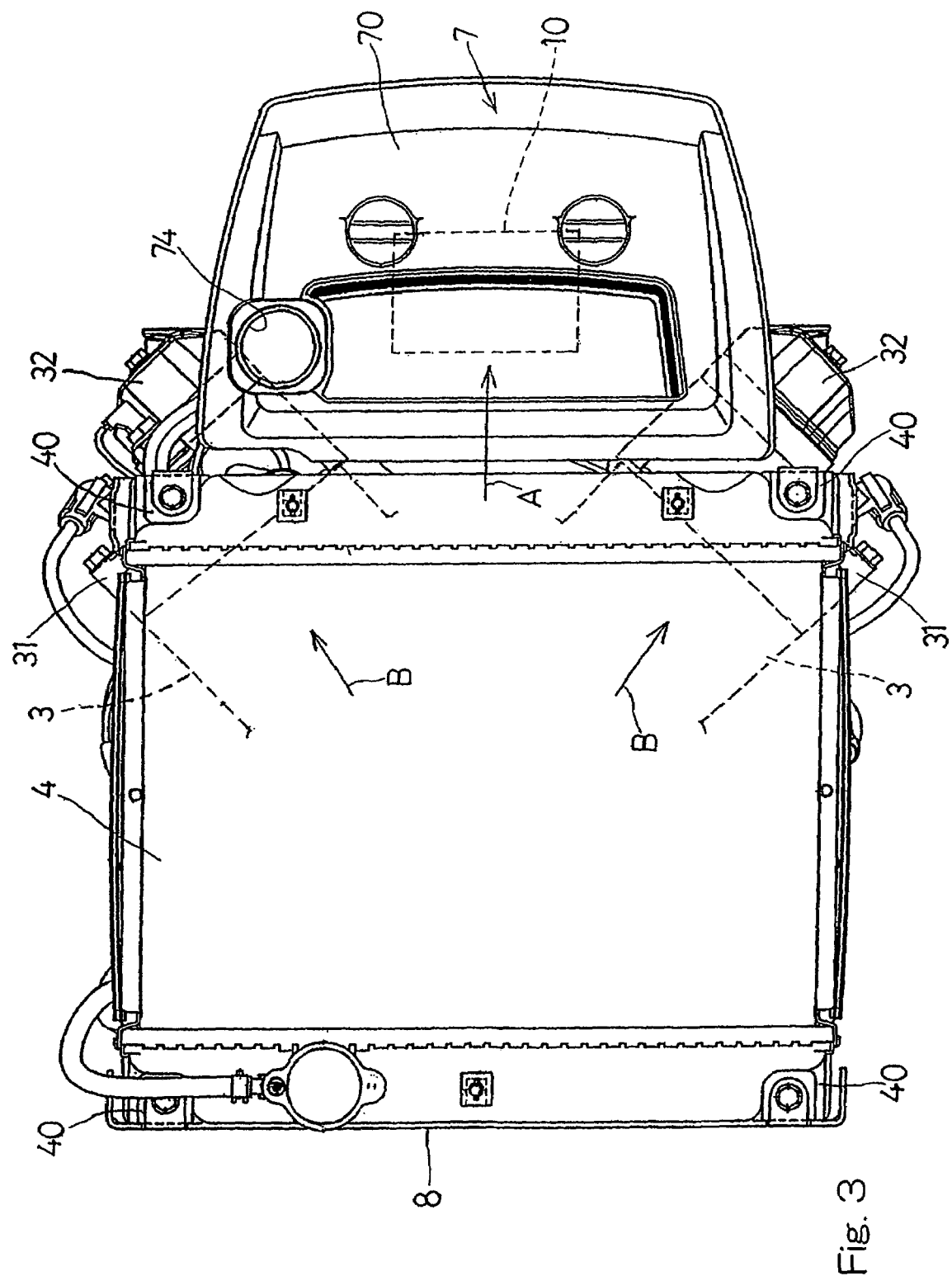
FIG. 3 is a top plan view of the internal combustion engine employing the air cleaner unit shown in FIG. 1.

As shown in FIG. 3, the combustion engine is a two-cylinder V-type including the two engine cylinders 3 and the respective cylinder heads 31 that are laid in a V-shaped arrangement protruding forwardly of the engine body E, and the fuel supply device 10 is disposed between those cylinder heads 31.

As described previously, the engine body E shown in FIG. 1 includes the crankcase 1, the engine cylinders 3, the cylinder heads 31 and the rocker cover 32. Specifically, an upper half 1a of the crankcase 1 and the engine cylinders 3 are integrated together into an engine casing EC. On the other hand, a lower half 1b of the crankcase 1 is connected to a lower portion of the engine casing EC and is defined by an engine base EB. A camshaft 16 and an oil pump 17, both drivingly connected with and adapted to be driven by the crankshaft 2 through a gear train (not shown), are accommodated within the crankcase 1.

As shown in FIG. 2, the duct 5 has top and bottom ends 5a and 5b opening upwardly and downwardly, respectively. The top open end 5a of the duct 5 has an inner diameter somewhat greater than the outer diameter of the cooling fan 6, whereas the bottom open end 5b of the duct 5 has an inner diameter substantially equal to the outer diameter of a flywheel 22 fixedly mounted on the crankshaft 2. The hollow of the duct 5 delimited between the top and bottom open ends 5a and 5b defines a space for accommodating the cooling fan 6 and a pulley 21 through which the fan 6 is mounted on the crankshaft 2.

The duct 5 is made of a synthetic resin such as polypropylene. This duct 5 has a plurality of, for example, four, mounting tongues 50 formed in an outer periphery of the duct 5, through which the duct 5 is fixed to the engine body E by means of a bracket 8. More specifically, the four mounting tongues 50 of the duct 5 and four mounting tongues 40, formed in four corner areas of the radiator 4, are overlapped one above the other through corresponding damper members 44 and are fixed in position on the bracket 8 by means of screw members 82 each firmly threaded into a corresponding nut 81 welded to the bracket 8.

The duct 5 includes a peripheral wall having a front portion, depleted to define a front discharge opening 51 from which a stream of cooling air induced by the cooling fan 6 can be discharged in a direction forwardly of the engine body E, and a rear portion depleted to define a rear discharge opening 54. Also, side portions of the peripheral wall of the duct 5 on respective sides of the front discharge opening 51 are formed respectively with side discharge ports 52 (FIG. 1) from which the stream of cooling air so induced can be discharged in a direction slantwise forwardly of the engine body E. The side discharge ports 52 are formed integrally with, or otherwise provided in any suitable manner with, respective louvers 53 (FIG. 1) so that the stream of cooling air induced by the cooling fan 6 can be forcibly discharged in a direction slantwise forwardly of the engine body E. As shown in FIG. 3, the streams of cooling air emerging outwardly from the front discharge opening 51 and the side discharge ports 52 impinge respectively on the fuel supply device 10 as shown by the arrow A and on the engine cylinders 3 and the cylinder heads 31 as shown by the arrow B, to thereby cool the fuel supply device 10 and the engine cylinder 3 and the cylinder heads 31. It is to be noted that the bracket 8, which is positioned rearwardly of the duct 5 as shown in FIG. 2, is held in proximity of a rear portion of the duct 5 and concurrently serves as a guide plate 86 for deflecting the stream of cooling air, emerging outwardly from the rear discharge opening 54, to flow in a direction laterally thereof.

A ring-shaped guide body 18 as shown in FIG. 2 is mounted inside the duct 5, and at least an upstream or upper portion of an outer periphery of the cooling fan 6, with respect to the direction of flow of the stream of cooling air induced by the cooling fan 6, is encircled by the guide body 18. This guide body 18 is sandwiched between the mounting tongues 40 of the radiator 4 and the mounting tongues 50 of the duct 5, and is therefore retained in position by the duct 5.

The air cleaner unit 7 has a relatively large vertical dimension (height) ranging from a point intermediate of the height of the duct 5 to a point generally in flush with a top surface of the radiator 4. This air cleaner unit 7, when viewed from top as shown in FIG. 3, represents a generally transversely elongated trapezoidal shape and is positioned forwardly of the radiator 4, which is substantially rectangular in shape. As shown in FIG. 2, the air cleaner unit 7 includes a cleaner case 70 and a filter element 72 accommodated within the cleaner case 70. The cleaner case 70 is made up of a case body 71 opening downwardly and a bottom plate 73 for closing the opening of the case body 71.

The filter element 72 is removably supported on a pedestal 60 that is fitted to the engine body E through the fuel supply device 10, the insulator 13 and the intake manifold 12. While it is preferred that an outer peripheral surface of the filter element 72 is substantially in flush with an outer peripheral surface of the pedestal 60, the filter element 72 may be placed radially inwardly of the pedestal 60.

Figure 4:
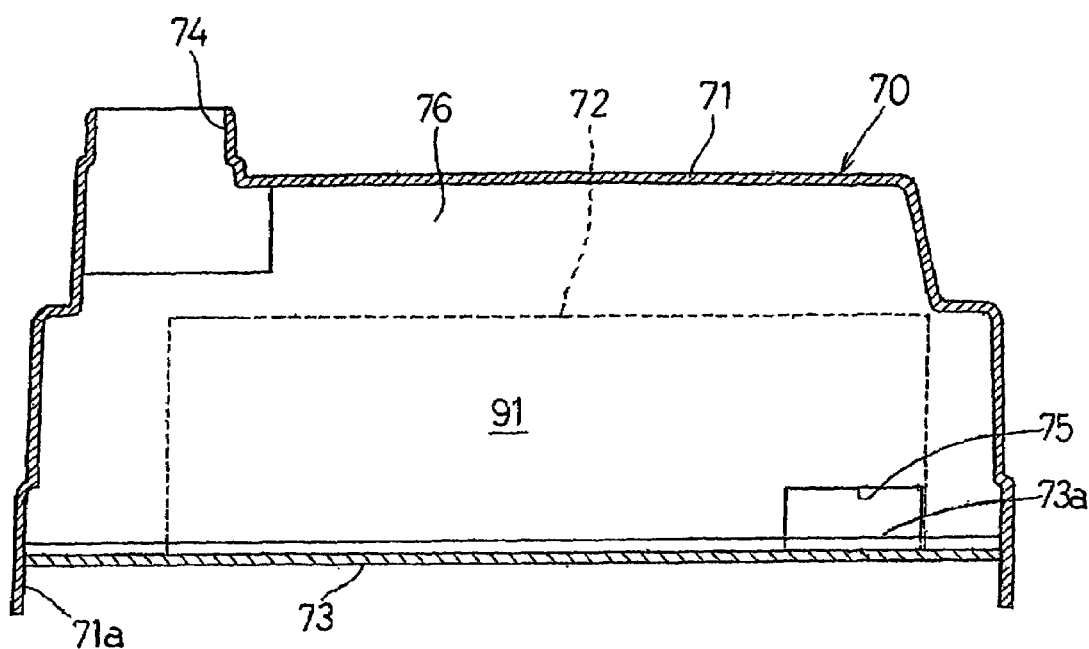
FIG. 4 is a cross-sectional view taken along the line IV—IV in FIG. 1.

As shown in FIG. 4 in a cross-sectional representation taken along the line IV—IV in FIG. 1, the case body 71 is generally made up of a four-sided peripheral wall and a top wall and has an upwardly opening air intake port 74 defined in a lateral portion of the top wall, which is adjacent a portion of the peripheral wall thereof with respect to the widthwise direction thereof, and includes a vertical partition wall 76 separating the air intake port 74 and the filter element 72 from each other. A communicating opening 75 for introducing an air from the air intake port 74 into the filter element 72 is defined in a location adjacent a lateral lower portion of the partition wall 76 remote from the air intake port 74.

As best shown in FIG. 2, the filter element 72 is in the form of a replaceable filter cartridge of a generally ring-shaped, double layered structure. This filter cartridge is made up of a generally tubular inner element layer 72A and a similarly tubular outer element layer 72B positioned outside the inner element layer 72A. The inner and outer element layers 72A and 72B are integrated into a unitary cartridge with their annular upper ends supported by a holder member 80a and with their annular lower ends supported by a frame member 80b. Thus, it will be readily seen that the replacement of the filter element 72 can be carried out on a cartridge basis.

Figure 10:
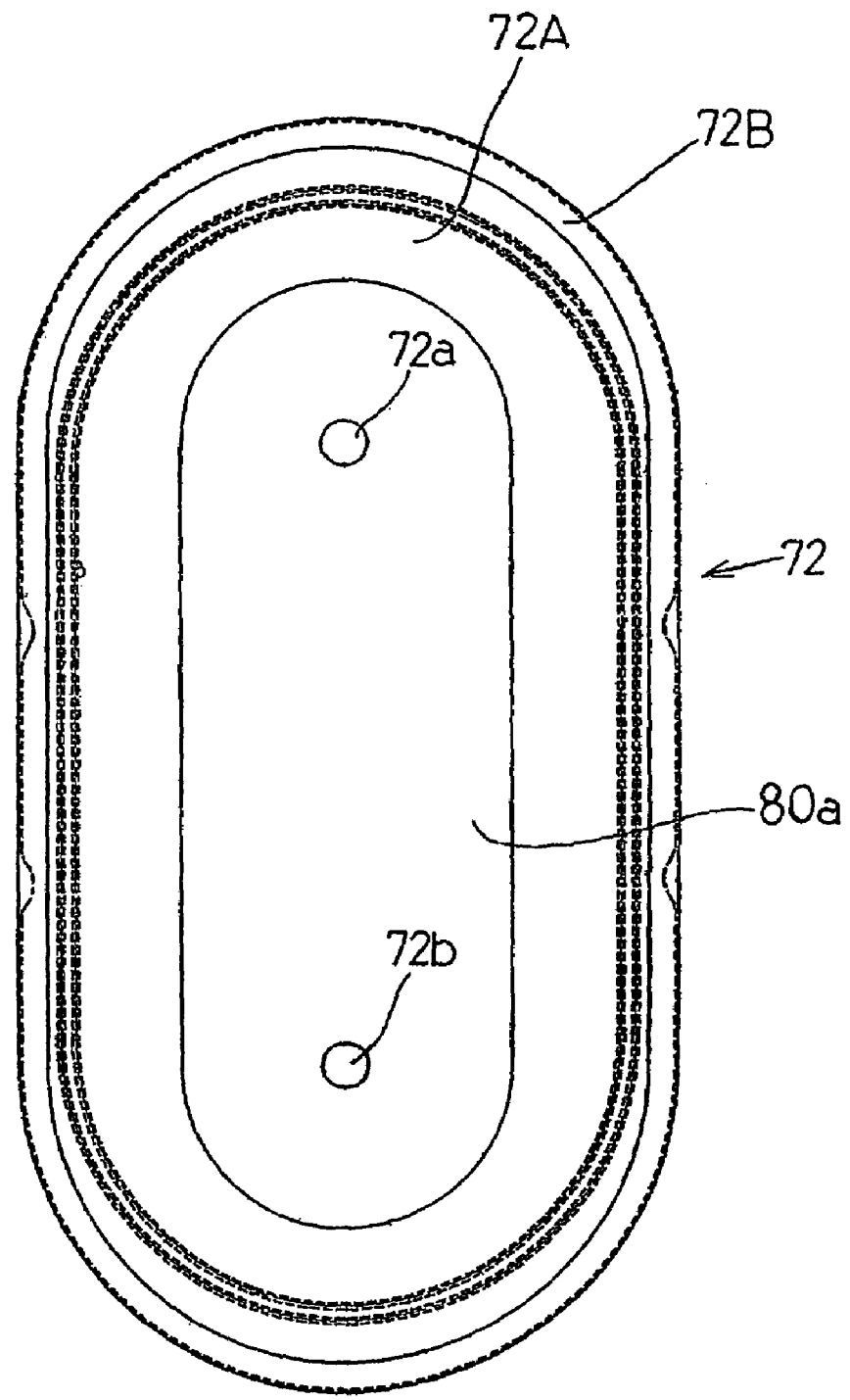
FIG. 10 is a top plan view of a filter element of the air cleaner unit.

The inner element layer 72A of the filter element 72 is prepared from a fine mesh filtering material whereas the outer element layer 72B thereof is prepared from a coarse mesh filtering material, so that by suppressing an early clogging of the inner element layer 72A by the outer element layer 72B the filtering performance of the filter element 72 can be increased. A lower end of the filter cartridge, that is, a lower open end of the hollow 100 of the tubular inner element layer 72A, defines an outflow port 101 for a stream of air which has been substantially purified by the filter cartridge. The filter element 72, when viewed from top as shown in FIG. 10, represents an elliptical shape, and the holder member 80a of a shape similar to the shape of the filter element 72 has opposite end portions formed with mounting holes 72a and 72b, respectively.

Figure 5:
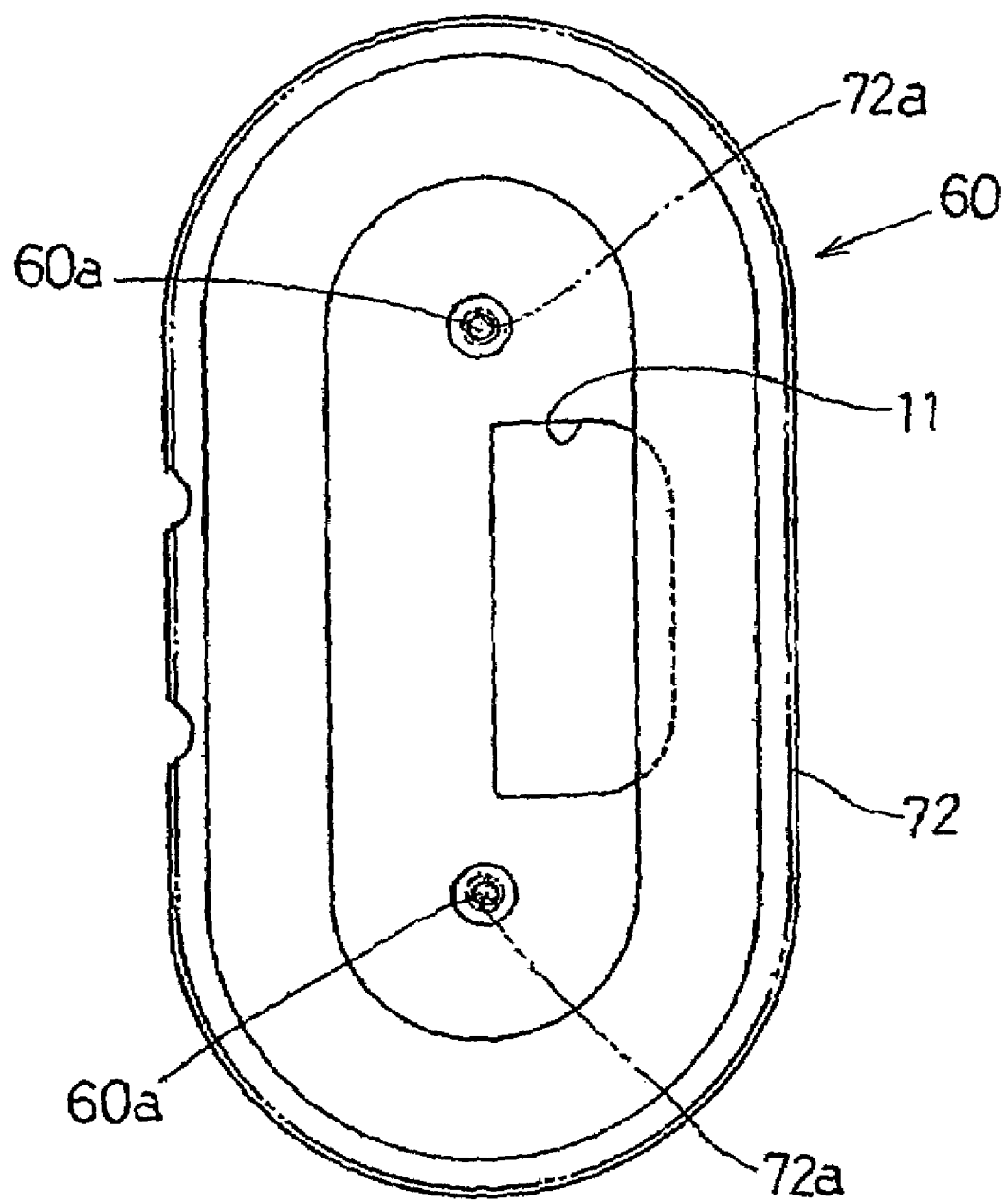
FIG. 5 is a top plan view showing a pedestal for the air cleaner unit.

Referring now to FIG. 5, the pedestal 60 for removably supporting the filter element 72, when viewed from top, represents an elliptical shape and is formed integrally with the intake pipe 11 positioned at an intermediate forward portion thereof. This intake pipe 11 is communicated with the fuel supply device 10, shown in FIG. 2, for introducing the purified air to the fuel supply device 10. This pedestal 60 has opposite end portions formed with bolts 60a and 60a extending in a direction perpendicular thereto, which are, when the filter element 72 is mounted on the pedestal 60, aligned with the mounting holes 72a and 72b of the holder member 80a, respectively. Thus, it will readily be seen that when the filter cartridge 72 is mounted on the pedestal 60, the bolts 60a and 60a extends through the mounting holes 72a and 72b so that the filter element 72 can be retained in position on the pedestal 60.

Figure 6:
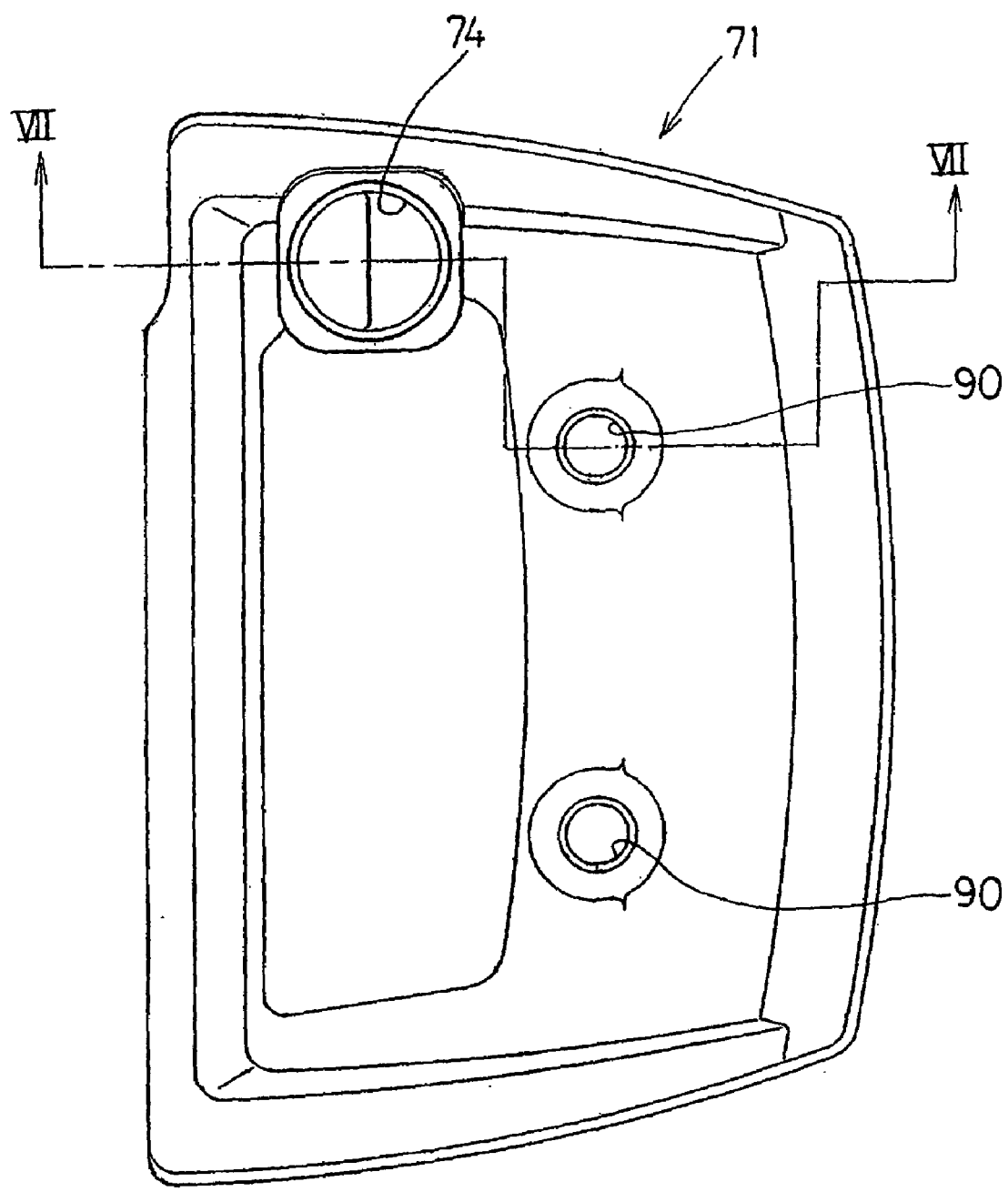
FIG. 6 is a top plan view of a case body of the air cleaner unit.
Figure 7:
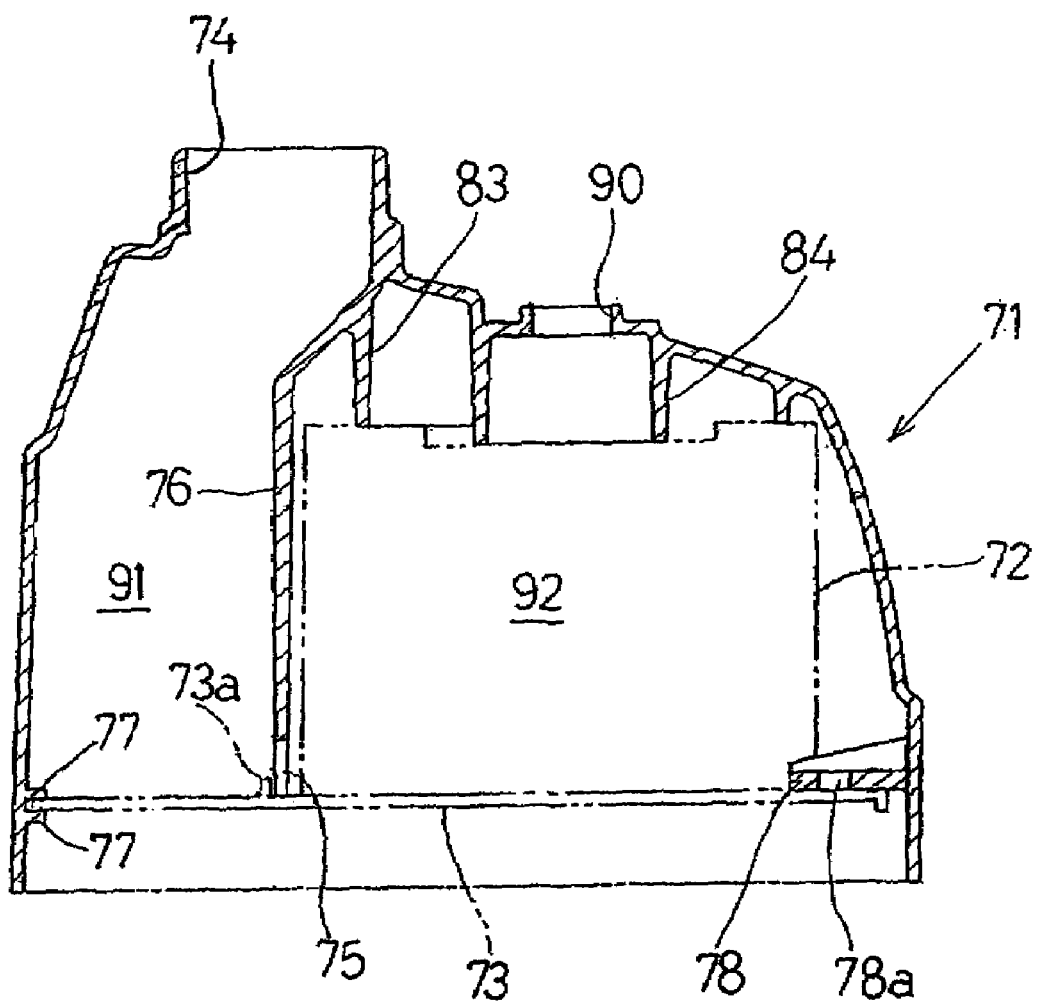
FIG. 7 is a cross-sectional view taken along the line VII—VII in FIG. 6.
Figure 8:
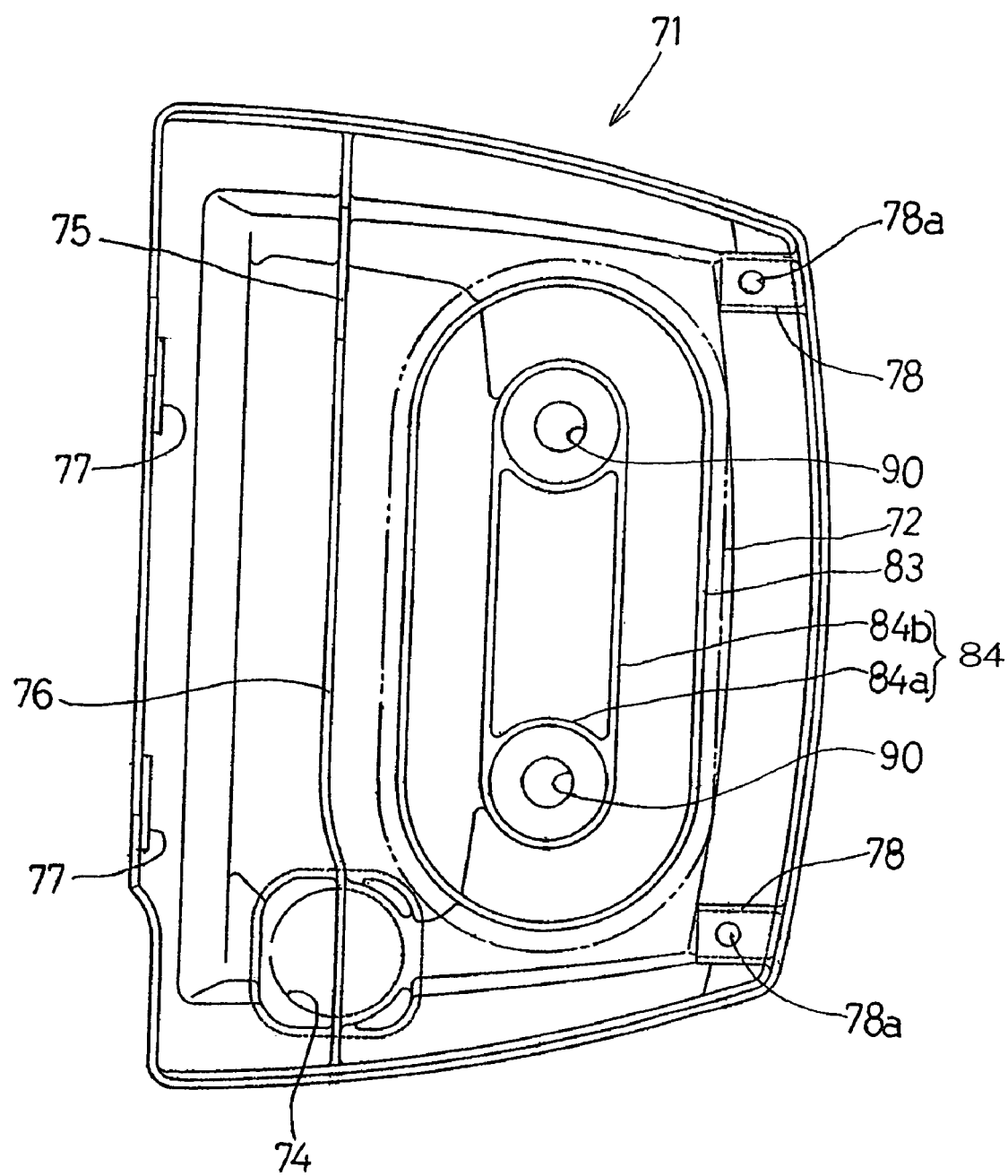
FIG. 8 is a bottom plan view of the case body.

FIGS. 6, 7 and 8 illustrate the case body 71 made of a synthetic resin, for example, polypropylene and the top wall of the case body 71 is formed with insertion holes 90 each aligned with a corresponding axis of the bolt 60a embedded in the pedestal 60 (FIG. 5). Second nuts 63a shown in FIG. 2 are inserted into the respective insertion holes 90 and are then threaded onto the corresponding bolts 60a to allow outer and inner ribs 83 and 84, formed in the top wall of the case body 71, to be engaged with a top surface of the filter element 72 with the case body 71 consequently supported on the top surface of the filter element 72. Thus, the case body 71 and the filter element 72 are removably supported on the engine body E through the pedestal 60, the fuel supply device 10, the insulator 13 and the intake manifold 12. As shown in FIG. 8, the outer rib 83, when viewed from interior of the case body 71, is formed to represent an elliptical shape nearly similar to the appearance of the filter element 72, whereas the inner rib 84 formed inwardly of the outer rib 83 is of a shape made up of round rib segments 84a, each encircling the corresponding insertion hole 90, and straight rib segments 84b connecting those round rib segments 84a together.

The interior of the case body 71 shown in FIG. 7 is divided by the vertical partition wall 76 into a first chamber or air intake chamber 91 adjacent and communicated with the air intake port 74 and a second chamber or filter element chamber 92 accommodating therein the filter element 72. An air drawn from above into the first chamber 91 through the air intake port 74 is introduced into the second chamber 92 only through the communicating opening 75 that communicates between the first and second chambers 91 and 92 with each other. The case body 71 has a rear portion provided with left and right engagement projections 77 for supporting the bottom plate 73 as will be described in detail later and a front portion provided with mounting lugs 78 each formed with a mounting hole 78a.

Figure 9:
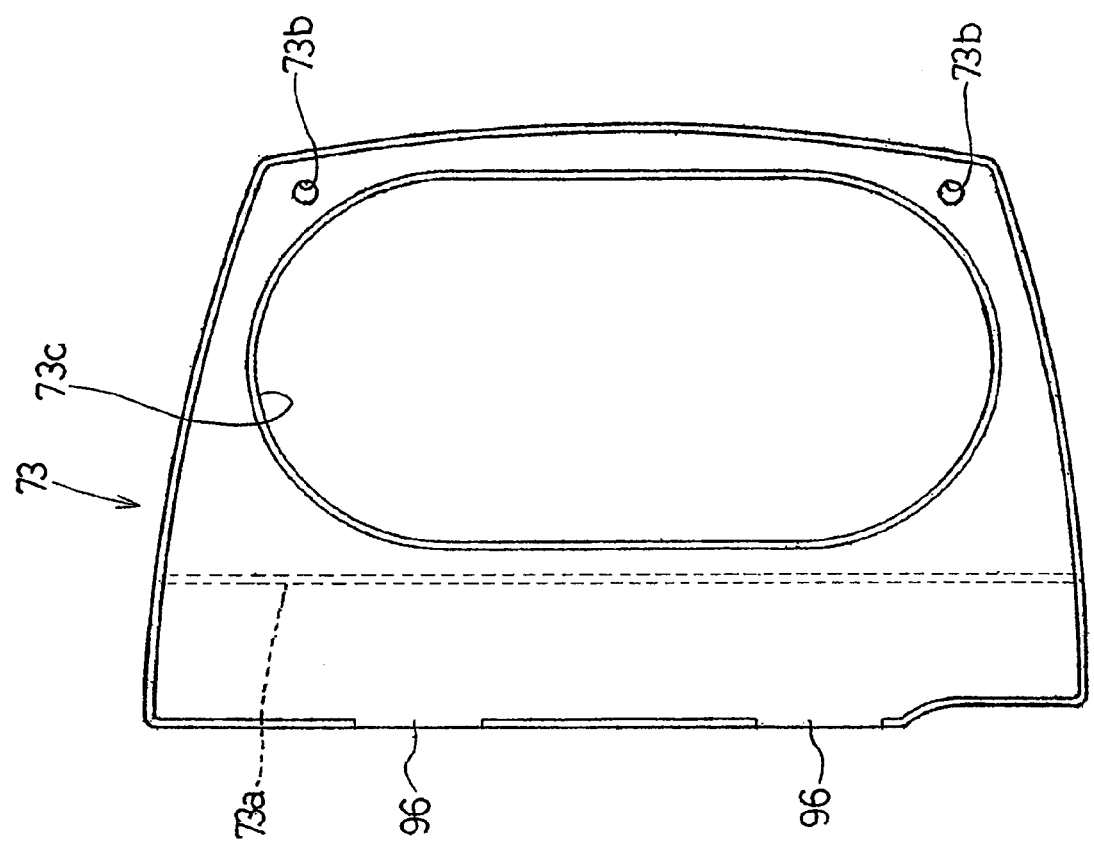
FIG. 9 is a bottom plan view of a bottom plate of the air cleaner unit.

As shown in FIGS. 4 and 7, the bottom plate 73 has an inner surface (upper surface) formed with an upwardly protruding flashing protuberance 73a having a portion confronting a lower portion of the communicating opening 75 to thereby avoid ingress of rain droplets into the communicating opening 75. As shown in FIG. 9, the bottom plate 73 is depleted at a center portion thereof to define an elliptical mounting hole 73c of a size that is so oversized slightly relative to an outer peripheral surface of the pedestal 60 (FIG. 5) as to provide a slight gap between the mounting hole 73c and the outer peripheral surface of the pedestal 60. The bottom plate 73 is formed with mounting holes 73b and 73b at front corner portions thereof as shown in FIG. 9, which holes 73b and 73b are aligned with the respective mounting holes 78a in the mounting lugs 78 of the case body 71 shown in FIG. 8.

When setting is made with the case body 71 (FIG. 8) capped onto the bottom plate 73, and while left and right engagements 96 at a rear portion of the bottom plate 73 are engaged with the corresponding engagement projections 77 and 77 shown in FIG. 8, plastic fastening members 61 (FIG. 2) are inserted into and fitted in the mounting holes 73b and 73b in the bottom plate 73 shown in FIG. 9 and the mounting holes 78a and 78a in the case body 71 shown in FIG. 8, respectively to thereby assemble the case body 71 with the bottom plate 73. It is to be noted that the bottom plate 73 is also made of a synthetic resin such as polypropylene and that each of the plastic fastening members 61 may be the one that is largely employed in automobiles in fixing interior equipments.

As shown in FIG. 2, when the case body 71 and the bottom plate 73, both forming respective parts of the cleaner case 70, and the filter element 72 are mounted on the pedestal 60, the filter element 72 is first placed on the pedestal 60 with the bolts 60a rigid with the pedestal 60 inserted through the respective mounting holes 72a (FIG. 10) in the filter element 72, followed by fastening of first nuts 62a onto the top ends of the bolts 60a to thereby fix the filter element 72 in position on the pedestal 60. Subsequently, the cleaner case 70 including the case body 71 assembled together with the bottom plate 73 is capped from above over the filter element 72 and then fixed on the pedestal 60, followed by fastening of the second nuts 63a onto the top ends of the bolts 60a with the cleaner case 70 consequently supported over the filter element 72.

With the air cleaner unit 7 so constructed as described hereinabove, the air drawn into the air intake port 74 in a top region of the air cleaner unit 7 is further drawn into the air cleaner unit 7. Since this is a top draw system, in which the air is drawn into the air cleaner unit 7 from above, and since no heated air drifting around the engine body E is not drawn into the air cleaner unit 7, which would occur in the case of a bottom draw system, advantages can be appreciated in terms of the air intake efficiency. The air drawn through the air intake port 74 subsequently flows through the air intake chamber 91, shown in FIG. 4, and then into the filter element chamber 72, where the filter element 72 shown in FIG. 2 is accommodated, through the communicating opening 75 defined in the bottom of the partition wall 76.

During the course of flow of the air from the air intake chamber 91 to the filter element chamber 92 by way of the communicating opening 75, dusts and dirt and rainwater, all having a substantial weight, are removed from the flowing air by the effect of an inertia force and are therefore prevented from entering the filter element 72. Rainwater accumulating within the air intake chamber 91 is prevented from entering the filter element chamber 92 by the flashing protuberance 73a disposed in the vicinity of the communicating opening 75. As a result thereof, adherence of the rainwater to the filter element 72 can be effectively prevented. On the other hand, as the air entering the filter element chamber 92 through the communicating opening 75 passes through the filter element 72, dusts and dirt still contained in the air are removed by adsorption, leaving a substantially purified air which is subsequently introduced into the fuel supply device 10 through the intake pipe 11 formed integrally with the pedestal 60.

When the filter element 72, that is, the filter cartridge is replaced with a fresh one, the second nuts 63a are first removed from the bolts 60a and the cleaner case 70 including the case body 71 and the bottom plate 73 is subsequently pulled upwardly, leaving the filter element 72 on the pedestal 60 while passing the filter element 72 through the mounting hole 73c of the bottom plate 73. Thereafter, the first nuts 62a are removed from the bolts 60a and the filter element 72 is then taken upwardly out of the bolts 60a supported on the pedestal 60.

The cleaner case 70 so removed are then cleansed to remove dust and dirt adhering to an inner surface thereof.

Mounting of the fresh filter element 72 and mounting of the cleaner case 70 can be carried out in a manner reverse to that hereinabove described, with the first and second nuts 62a and 63a successively threaded onto the associated bolts 60a. It is to be noted that the bolts 60a are commonly utilized to support the cleaner element 72 and the cleaner case 70, the structure can advantageously be simplified and the number of component parts used can also be reduced.

As hereinbefore fully described, since, when the filter element 72 is removed from the pedestal 60, the cleaner case 70 has already been removed with the filter element 72 exposed to the outside, the filter element 72 can easily be removed from the pedestal 60. Also, considering that the cleaner case 70 is removed from the pedestal 60 prior to the filter element 72 being removed from the pedestal 60, there is no possibility that when the filter element 72 is removed, dust and dirt adhering to an outer periphery of the filter element 72 may fall into the cleaner case 70 and subsequently enter the combustion engine.

Also, considering that the outer periphery of the pedestal 60 is substantially in flush with the outer periphery of the filter element 72, there is no space between the outer peripheral surface of the filter element 72 and the outer peripheral surface of the pedestal 60, into which dust and dirt adhering to the outer periphery of the filter element 72 may fall and then accumulate. Accordingly, dust and dirt separated from the outer periphery of the filter element 72 during removal of the filter element 72 can fall to the outside substantially in their entirety and, therefore, they can hardly enter the combustion engine past the pedestal 60 and by way of the outflow port 101. Since removal of the dust and dirt adhering to the inner surface of the cleaner case 70 is carried out while the cleaner case 70 has been removed from the pedestal 60, such dust and dirt will in no way enter the combustion engine.

Yet, since the outer peripheral surface of the pedestal 60 is surrounded by the mounting hole 73c (FIG. 9) formed in the bottom plate 73, the dust and dirt within the cleaner case 70 can be discharged to the outside from the slight gap between the outer peripheral surface of the pedestal 60 and the mounting hole 73c during the operation of the combustion engine. Also, since the cleaner case 70 can easily be removed and separated from the filter element 72 merely by moving the cleaner case 70 straight in a direction perpendicular to the pedestal 60, the workability associated with maintenance is excellent. In addition, since the pedestal 60 is of one-piece construction including the intake pipe 11, the number of component parts used and the number of assembling steps can advantageously be reduced.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An air cleaner unit for a combustion engine, which comprises:
   a removable cleaner case having defined therein an outflow port for discharging an air, which is introduced into the cleaner case, towards the combustion engine, the cleaner case including a case body opening downwardly and a bottom plate closing the opening of the case body;
   a filter element replaceably accommodated within the cleaner case for substantially purifying the air introduced into the cleaner case, the outflow port being defined at a location below the filter element;
   a pedestal carried by the combustion engine and having an outer peripheral surface, the filter element within the cleaner case being removably mounted on the pedestal; and
   the bottom plate of the cleaner case having a mounting hole defined therein and encircling the outer peripheral surface of the pedestal, the mounting hole provided for passing the filter element.

2. The air cleaner unit for the combustion engine as claimed in claim 1, wherein the outer peripheral surface of the pedestal is substantially in flush with an outer peripheral surface of the filter element.

3. The air cleaner unit for the combustion engine as claimed in claim 2, wherein the cleaner case has an air intake port defined therein at a location adjacent one side thereof for introducing the air into the cleaner case and also has a partition wall separating the air intake port from the filter element and wherein the partition wall has a communicating opening defined therein at a location adjacent the opposite side of the cleaner case spaced a distance from the air intake port for allowing the air, introduced through the air intake port, to flow therethrough across the filter element.

4. The air cleaner unit for the combustion engine as claimed in claim 3, wherein the partition wall extends substantially vertically within the cleaner case.

5. The air cleaner unit for the combustion engine as claimed in claim 4, wherein the air intake port is defined in a top portion of the cleaner case and the communicating opening is defined in a lower portion of the partition wall.

6. The air cleaner unit for the combustion engine as claimed in claim 4, wherein the bottom plate has a flashing protuberance so defined at a lower portion of the communicating opening as to extend upwardly for avoiding ingress of a liquid medium into the filter element through the communicating opening.

7. The air cleaner unit for the combustion engine as claimed in claim 1, further comprising an intake pipe formed integrally with the pedestal for introducing the substantially purified air into a fuel supply device of the combustion engine.

8. The air cleaner unit for the combustion engine as claimed in claim 1, wherein the pedestal has at least one bolt embedded therein and extending through the filter element and wherein the filter element is fixed on the pedestal by means of a first nut threaded onto a top end of the bolt and the cleaner case, while covering the filter element, is immovably supported on the pedestal by means of a second nut threaded onto the top end of the bolt.

* * * * *